United States Patent
Fogagnolo et al.

(10) Patent No.: US 6,766,728 B2
(45) Date of Patent: Jul. 27, 2004

(54) DEVICE FOR CONTROLLING THE LEVEL OF A LIQUID IN A BOILER OF A COFFEE MACHINE

(75) Inventors: Armando Fogagnolo, Villastanza di Parabiago (IT); Roberto Radaelli, Villastanza di Parabiago (IT)

(73) Assignee: Rancilio Macchine per Caffe' S.p.A., Milan (IT)

(*) Notice: Subject to any disclaimer, the term of this patent is extended or adjusted under 35 U.S.C. 154(b) by 86 days.

(21) Appl. No.: 10/203,608

(22) PCT Filed: Feb. 12, 2001

(86) PCT No.: PCT/EP01/01465
§ 371 (c)(1),
(2), (4) Date: Aug. 12, 2002

(87) PCT Pub. No.: WO01/60221
PCT Pub. Date: Aug. 23, 2001

(65) Prior Publication Data
US 2003/0019367 A1 Jan. 30, 2003

(30) Foreign Application Priority Data
Feb. 16, 2000 (IT) .................................... TO2000A0150

(51) Int. Cl.⁷ .............................................. A47J 31/00
(52) U.S. Cl. .............................. 99/280; 99/285; 99/279

(58) Field of Search .......................... 99/280, 281, 282, 99/283, 279, 285; 340/563, 618, 631, 620; 361/284, 286, 301, 303, 301.1; 324/662, 663; 73/304 C

(56) References Cited

U.S. PATENT DOCUMENTS

| | | | |
|---|---|---|---|
| 4,261,397 A | | 4/1981 | Guy |
| 5,365,783 A | * | 11/1994 | Zweifel ................. 73/304 C |
| 5,388,501 A | | 2/1995 | Hazan et al. |

FOREIGN PATENT DOCUMENTS

| | | |
|---|---|---|
| EP | 0 377 508 A | 7/1990 |
| GB | 696 907 A | 9/1953 |
| NL | 8 400 492 A | 9/1985 |

* cited by examiner

Primary Examiner—Reginald L. Alexander
(74) Attorney, Agent, or Firm—Paul & Paul

(57) ABSTRACT

A device for controlling the level of a liquid in a boiler (40) of an espresso coffee machine (60), in which the boiler (40) is connected with an external cylindrical container (24) made of dielectric material, comprises a capacitive sensor (30), coupled externally of cylindrical container (24), and means (32) for detecting the changes in the capacitance of the capacitive sensor (30), thereby generating an electric signal representative of the liquid level in the boiler, and for controlling the liquid flow into the boiler.

4 Claims, 3 Drawing Sheets

DEVICE FOR CONTROLLING THE LEVEL OF A LIQUID IN A BOILER OF A COFFEE MACHINE

The present invention relates to devices for controlling the level of a liquid in a container. More particularly the invention relates to a device for detecting the water level inside a boiler of an espresso coffee machine, said device using a capacitive sensor associated with means for detecting changes in the sensor capacitance of said capacitive sensor and for automatically controlling water flow into the boiler, so as to keep the desired level constant.

As known, espresso coffee machines comprise a boiler for containing and heating the water, a water pressurising device, one or more coffee delivery groups and other internal and external accessories. The whole of those units is enclosed within an external casing.

Generally the boiler is coupled with a duct for cold water supply, by which the optimum water level is recovered during use, preferably in automatic manner. An electrically actuated valve is therefore present along the supply duct, which valve is controlled by a suitable system monitoring the level in the boiler and actuating the electric valve in correspondence with a minimum level and until a desired level is reached.

Many detectors used for monitoring the level comprise a probe equipped with one or more rods of electrically conductive material, which are introduced directly in the boiler or in a suitable vessel in communication with the boiler. When contacting the liquid, said rods signal the level reached by the liquid to the control system. Indeed such probes exploit the conductive properties of the liquids and allow measuring the electrical resistance between each rod and a ground contact in the boiler. Actually the boiler is generally made of metal, in order to bear the high temperature and pressure to which it is exposed.

FIG. 1 shows an example of a prior art level probe employed in an espresso coffee machine. Probe 2 comprises a glass tube 4, located between a bottom coupling member 6 and a top coupling member 8, and a central electrically conductive rod 10, located inside tube 4. The two coupling members 6, 8 establish communication between the interior of tube 4 and the interior of a boiler, the bottom and the top of the boiler, respectively. Thus the liquid contained in the boiler enters tube 4 and keeps therein a level corresponding to the level in the boiler. Of course, for a correct operation, the probe and the boiler must be located at about the same level. If the liquid level is above dashed line 14, rod 10 is in contact with the liquid and its electrical resistance, measured relative to the boiler ground, is very low. When on the contrary the liquid level decreases below dashed line 14, the measured resistance is higher, since air or steam in the upper boiler part have greater resistance than water. The control system exploits this principle to actuate the electric valve controlling water flow into the boiler.

However, direct contact of rod 14 with the liquid contained in the boiler may cause some drawbacks, especially as time goes by. The particular environment in which the rod is immersed, namely hot water or steam, promotes metal oxidation and causes the formation of calcareous residuals and the deposition of foreign substances possibly present in water. All those phenomena, which as time goes by make the probe resistance vary, can result in malfunctioning of the control system and can give rise to critical situations, even from the safety standpoint, in the overall machine operation.

GB-A 696 907 discloses a level regulating device employing a capacitive sensor coupled to a glass tube communicating with the container where the level is to be regulated. The sensor includes a capacitors of which a first electrode comprises a pair of metal sleeves surrounding the glass tube and the other electrode is a wire immersed in the liquid. The device has the same drawbacks as the prior art discussed above. Moreover, a two-piece electrode is required to detect a maximum and a minimum admitted level.

EP-A 0 377 508 discloses a capacitive liquid level sensor, in particular to detect the lower limit of acceptable fuel level within the fuel reservoir in a motor vehicle. That sensor includes a capacitor, of which one armature is a plate directly mounted on a reservoir wall, at a position to sense the lower level limit, and the second armature is the reservoir ground. The device is scarcely flexible, since the sensor is to be directly mounted on the wall of the reservoir. No provision is made for a direct inspection of the level.

It is an object of the present invention to provide a device which is of simple construction and is capable of detecting the liquid level in precise manner, while ensuring high safety in all operating conditions.

The above and other objects are achieved by the device for controlling the level in a boiler of a coffee machine made in accordance with the invention, as claimed in the appended claims.

Advantageously the device made in accordance with the invention can be employed in professional or super-automatic espresso coffee machines, i.e. machines equipped with a system for the automatic filling of the hot water boiler.

The above and other objects of the invention will become more apparent from the description of a preferred embodiment, with reference to the accompanying drawings, in which.

Figure 1:
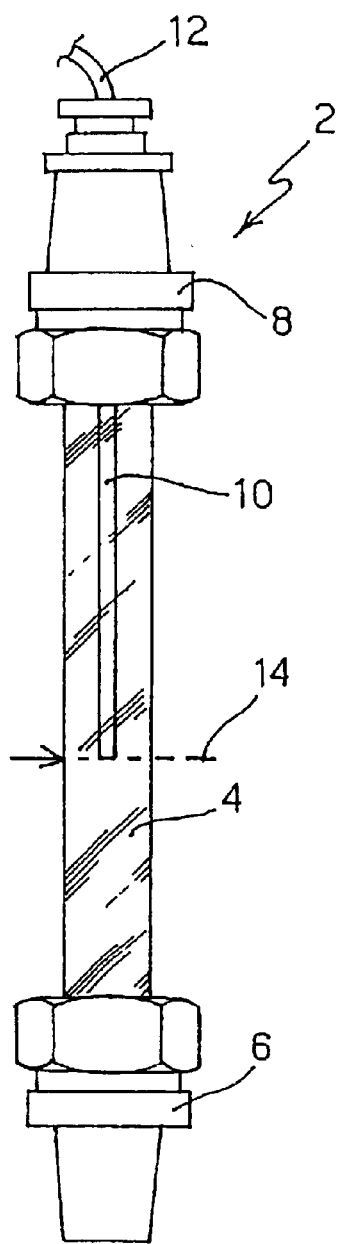
FIG. 1 is a front view of a prior art level probe, employed in an espresso coffee machine.
Figure 2:
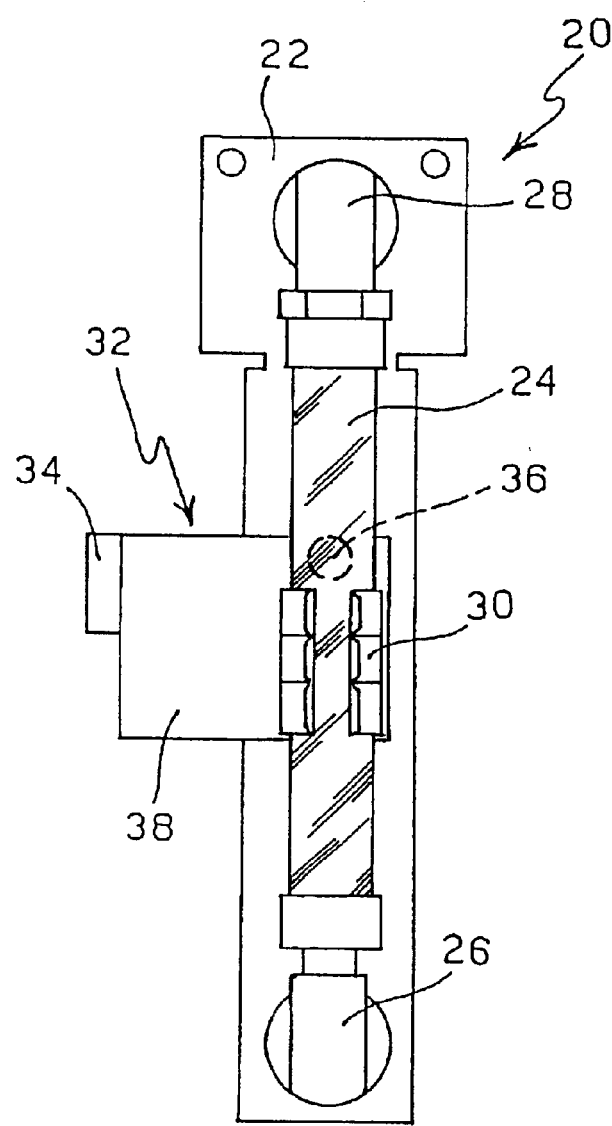
FIG. 2 is a front view of a level probe made in accordance with the present invention.
Figure 3:
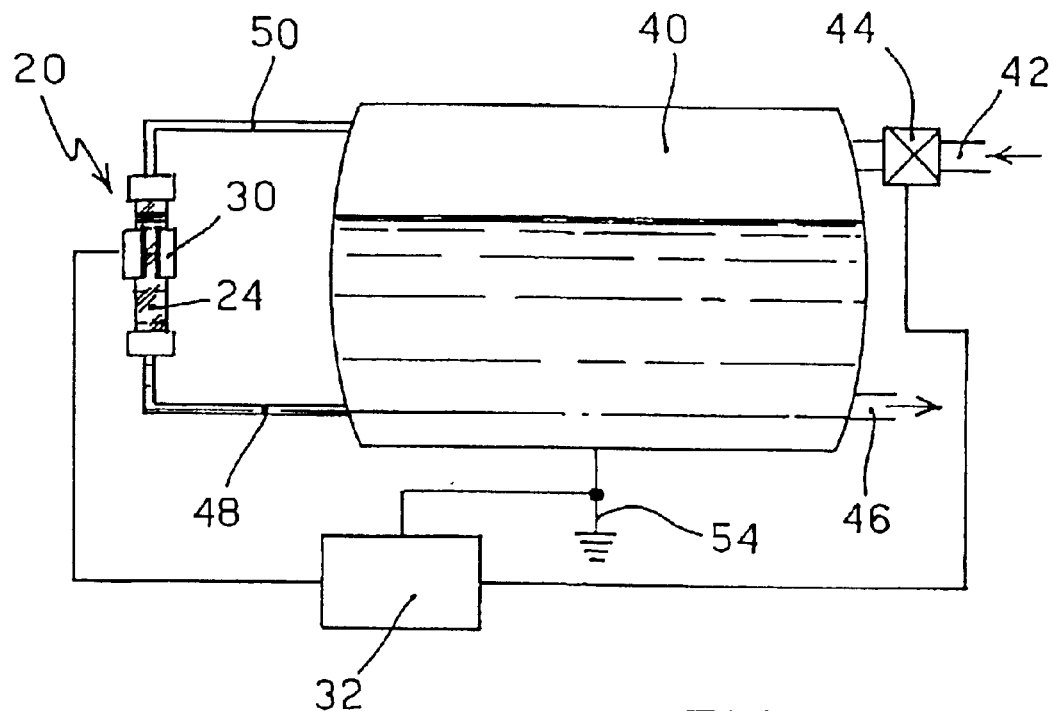
FIG. 3 is a schematical view of a system for controlling the water level in a boiler of a coffee machine, made in accordance with the present invention.

As shown in FIGS. 2 and 3, a device for controlling the level of a liquid in a boiler 40 of an espresso coffee machine essentially comprises a level probe 20, a control circuit 32 and an electrically actuated valve 44, which controls liquid flow into the boiler.

FIG. 2 shows in detail level probe 20 and control circuit 32, which in the present exemplary embodiment is located in the close vicinity of probe 20.

Probe 20 includes a tube 24 of dielectric material, e.g. of glass or preferably of a plastic material like Teflon®. Actually, by using a transparent material and by locating the probe at a machine point visible from outside, it is possible to have a visual check on the actual liquid level, even when the machine is off or the automatic control system is not operating.

A capacitive sensor 30 is applied externally of tube 24, the sensor consisting of a U-bent metal sheet partly surrounding tube 24. Metal sheet 30 is directly welded onto a printed circuit board 38 bearing the electronic components of control circuit 32, as it will be disclosed in detail hereinafter with reference to FIG. 4.

A two-colour LED 36 is present on printed circuit 38, preferably behind tube 24 so as to be visible from outside the machine. Such LED signals both the correct supply of board 32, by a green light, and the lack of water in the boiler, and hence the enabling of electrically actuated valve 44, by a red light.

An electrical connector 34 allows supplying control circuit 32 and controlling electrically actuated valve 44, either directly or through an electric/electronic power interface, for instance a relay.

FIG. 3 schematically shows a boiler 40 of a coffee machine equipped with a device for automatically controlling the water level. Boiler 40 has an entrance duct 42 for cold water, cut by electric valve 44, and an exhaust duct 46 for hot water.

Probe 20 is connected with boiler 40 through two small ducts 48, 50: more particularly, the bottom probe end 26 is connected with the lower part of boiler 40, whereas the probe top end 28 is connected with the upper boiler part. In this way, the water level in tube 24 of probe 20 is at the same level as the water in the boiler. Of course, for a correct operation, the probe must be located at a level corresponding to the desired water level in the boiler.

In the diagram shown in FIG. 3, control circuit 32 is shown separately from probe 20 merely in order to show the electrical connections among the parts. Actually, in order to achieve a higher sensitivity and, above all, immunity to noises, capacitive sensor 30 must be located in the close vicinity of the dedicated electronic circuit, as disclosed hereinbefore with reference to FIG. 2.

Control circuit 32 controls, either directly or through a relay, electrical valve 44 controlling water flow into the boiler.

Control circuit 32, which has a ground terminal connected to ground terminal 54 of boiler 40, is arranged to measure changes in the capacitance of sensor 30 relative to ground due to water movement within the probe, and to compare each sensed capacitance value with one or more threshold values, thereby generating a control signal for electric valve 44.

Figure 4:
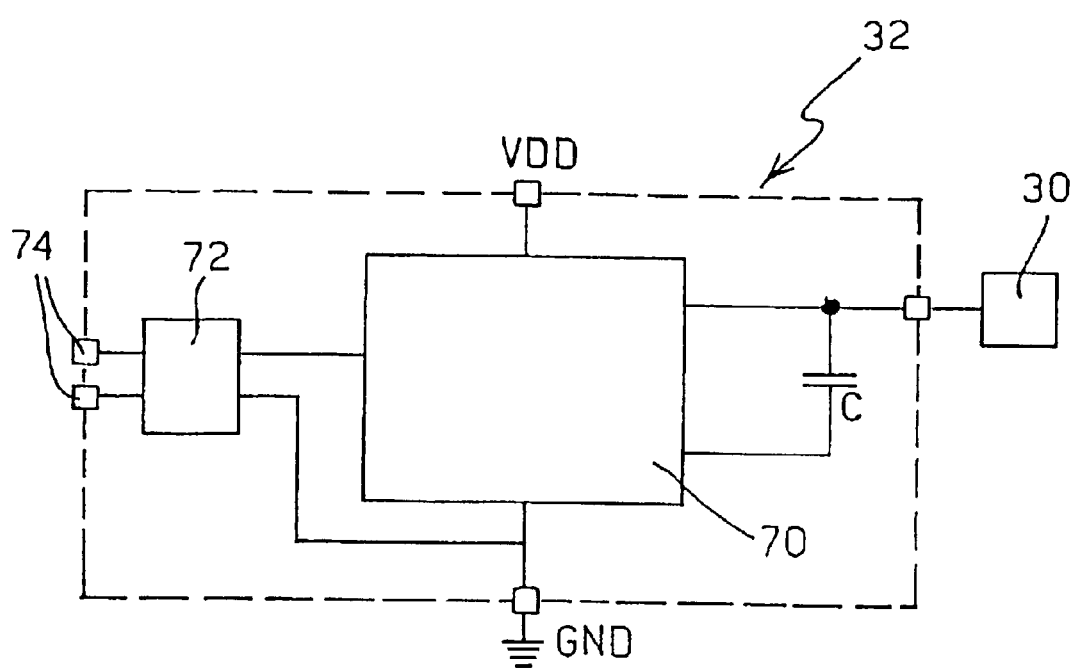
FIG. 4 is an electrical block diagram of a control circuit of the control system shown in FIG. 3.

FIG. 4 shows a simplified block diagram of control circuit 32. An integrated circuit 70, especially designed for detecting the presence or the vicinity of a liquid by means of a capacitive probe, is entrusted with acquiring the signal coming from the probe, comparing it with a predetermined threshold level and generating a digital output signal signalling the presence/absence of the liquid. Such a circuit is commercially available and is included in the catalogue of many manufacturers of semiconductor devices.

The output of integrated circuit 70 drives an optical isolator 72 of which output 74 controls electric valve 44, possibly through a power driver not shown in the drawing. The optical isolator ensures isolation between the electro-mechanical part of the control system (electric valve 44) and the electronic part (circuit 32).

A single discrete component external to integrated circuit 70, namely capacitor C, is used as reference capacitor, to adapt the physical and mechanical characteristics of the sensor (i.e. size, thickness, material employed) to the input specifications for the integrated circuit.

Figure 5:
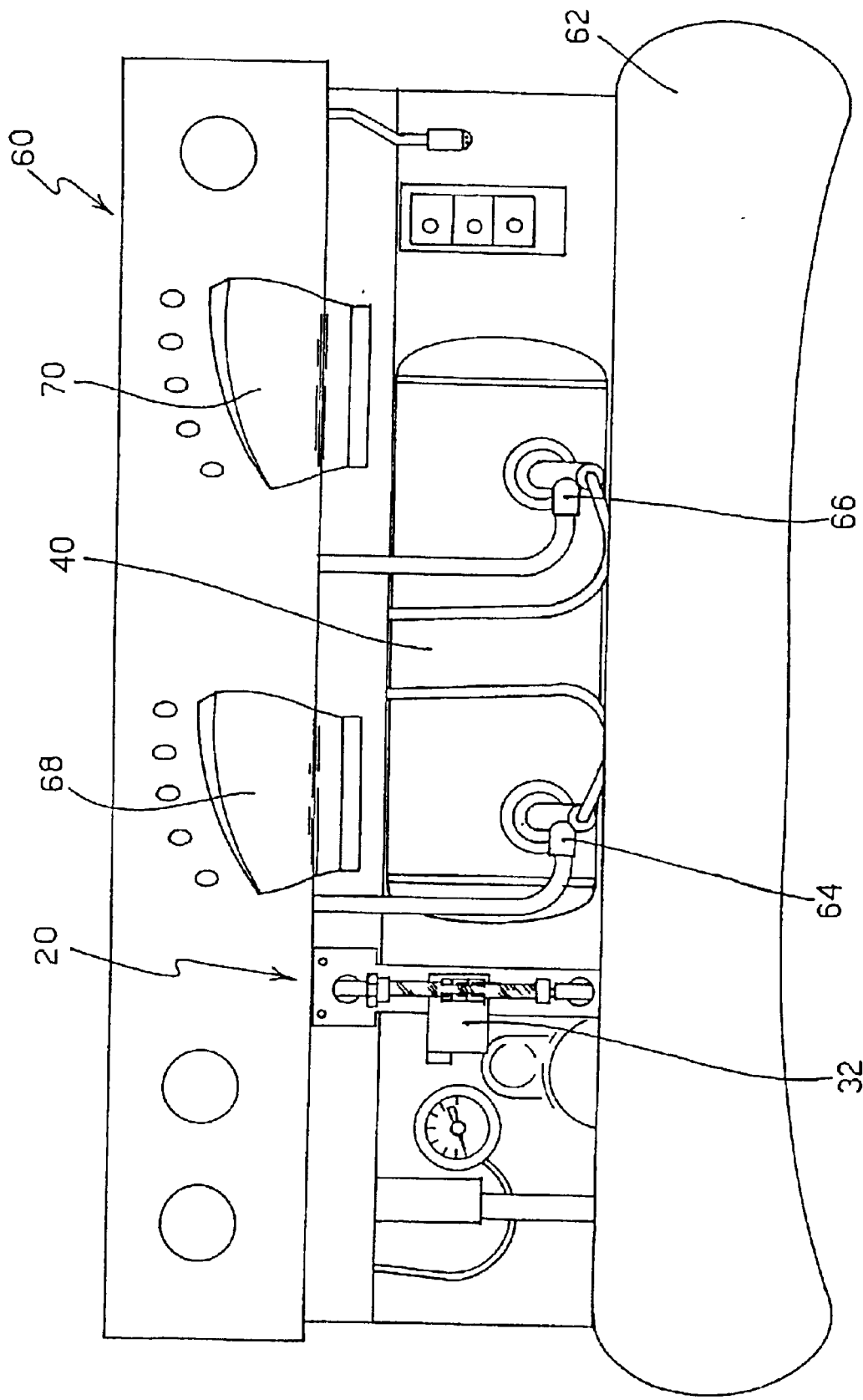
FIG. 5 is a front view of a coffee machine incorporating a system for controlling the water level made in accordance with the present invention.

FIG. 5 shows instead an espresso coffee machine 60 equipped with a device according to the present invention for controlling the water level in the boiler. The front panel of the machine has been removed for illustration purposes.

Machine 60 comprises a bearing structure 62 housing all functional elements of the machine, some of them being partly visible in the drawing, e.g. boiler 40 with two exhaust ducts 64, 66 connected with two coffee delivery groups 68, 70. Level probe 20, connected to the boiler according to the connection diagram disclosed hereinbefore with reference to FIG. 3, is arranged on the left of boiler 40, in a front position so as to be visible through a window in the front panel.

What is claimed is:

1. A device for controlling the level of a liquid in a container (40), the device comprising a capacitive sensor (30) coupled externally of at least a member (24) of the container (40), made of dielectric material and communicating with the container interior, and means (32) for detecting changes in the capacitance of said capacitive sensor (30) and generating at least one electric signal that is representative of the level of said liquid in said portion (24) of dielectric material and controls the flow of the liquid into the container, characterized in that said container (40) is the boiler (40) of an espresso coffee machine (60) in which water is kept at a pressure higher than atmospheric pressure and at a temperature higher than ambient temperature, and in that said detecting and generating means (32) comprise an electronic circuit (70) measuring the capacitance of said capacitive sensor (30) relative to a ground terminal (54) electrically connected to said boiler (40).

2. A device as claimed in claim 1, wherein said portion (24) of dielectric material is made of a transparent material and is visible from outside said coffee machine (60), to allow a visual check on the liquid level in the boiler (40).

3. A device as claimed in claim 1 or 2, wherein said capacitive sensor (30) is an electrically conductive sheet partly surrounding a tubular member (24) forming said portion of dielectric material and directly welded onto a printed circuit board (38) bearing the electronic components of said detecting and generating means (32).

4. A device as claimed in claim 3, wherein a valve (44) is provided for controlling water flow into the boiler, and wherein said detecting and generating means (32) comprised a two-colour LED (36) arranged at a position visible from outside said coffee machine (60) and arranged to signal both the correct supply of said detecting and generating means (32), through a light of a first colour, and an insufficient water level, and hence the controlling of said valve (44), through a light of a second colour.

* * * * *